United States Patent
Kwatra et al.

(10) Patent No.: US 11,223,595 B2
(45) Date of Patent: Jan. 11, 2022

(54) METHODS AND SYSTEMS FOR MANAGING COMMUNICATION SESSIONS FOR DISCUSSION COMPLETENESS

(71) Applicant: INTERNATIONAL BUSINESS MACHINES CORPORATION, Armonk, NY (US)

(72) Inventors: Shikhar Kwatra, Durham, NC (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 131 days.

(21) Appl. No.: 16/116,883

(22) Filed: Aug. 29, 2018

(65) Prior Publication Data
US 2020/0076762 A1 Mar. 5, 2020

(51) Int. Cl.
*G06F 15/16* (2006.01)
*H04L 12/58* (2006.01)
*H04M 3/22* (2006.01)
*G06F 16/2457* (2019.01)

(52) U.S. Cl.
CPC ........ *H04L 51/34* (2013.01); *G06F 16/24575* (2019.01); *H04M 3/2281* (2013.01)

(58) Field of Classification Search
CPC . H04L 51/34; G06F 16/24575; H04M 3/2281
See application file for complete search history.

(56) References Cited

U.S. PATENT DOCUMENTS

| | | | | |
|---|---|---|---|---|
| 8,069,131 | B1 * | 11/2011 | Luechtefeld | G06Q 10/10 706/47 |
| 2015/0081299 | A1 | 3/2015 | Jasinschi et al. | |
| 2015/0356836 | A1 | 12/2015 | Schlesinger et al. | |
| 2016/0164813 | A1 | 6/2016 | Anderson et al. | |
| 2018/0196796 | A1 * | 7/2018 | Wu | G06F 40/289 |
| 2019/0005024 | A1 * | 1/2019 | Somech | H04L 51/36 |

* cited by examiner

*Primary Examiner* — Suraj M Joshi
*Assistant Examiner* — Jaren Means
(74) *Attorney, Agent, or Firm* — Griffiths & Seaton PLLC

(57) ABSTRACT

Embodiments for managing a communication session by one or more processors are described. A communication session including a plurality of communications sent between a plurality of entities is monitored. A recommended communication for the communication session is determined based on the plurality of communications and at least one data source associated with at least one of the plurality of entities. A signal representative of the recommended communication is generated.

18 Claims, 6 Drawing Sheets

METHODS AND SYSTEMS FOR MANAGING COMMUNICATION SESSIONS FOR DISCUSSION COMPLETENESS

BACKGROUND OF THE INVENTION

Field of the Invention

The present invention relates in general to computing systems, and more particularly, to various embodiments for managing communication sessions for discussion completeness.

Description of the Related Art

In recent years, multiple methods and systems of communication have been developed and are now frequently used, such as voice communication (e.g., telephonic) systems, video communication (e.g., video call) systems, and text-based communication (e.g., text messaging, email, etc.) systems. In some instances, after the session (e.g., a phone call) has ended, at least one of the parties (e.g., entities, individuals, groups of individuals, etc.) involved in the session realizes that there are topics that they meant to (or wanted to or should) have discussed in the session but were not (e.g., they forgot to discuss the topic(s)).

In such instances, typically, another communication session, or at least additional communications (e.g., phone call, text messages, etc.), have to be initiated or sent in order for such matters to be discussed or clarified.

SUMMARY OF THE INVENTION

Various embodiments for managing a communication session by one or more processors are described. In one embodiment, by way of example only, a method for managing a communication session, again by one or more processors, is provided. A communication session including a plurality of communications sent between a plurality of entities is monitored. A recommended communication for the communication session is determined based on the plurality of communications and at least one data source associated with at least one of the plurality of entities. A signal representative of the recommended communication is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
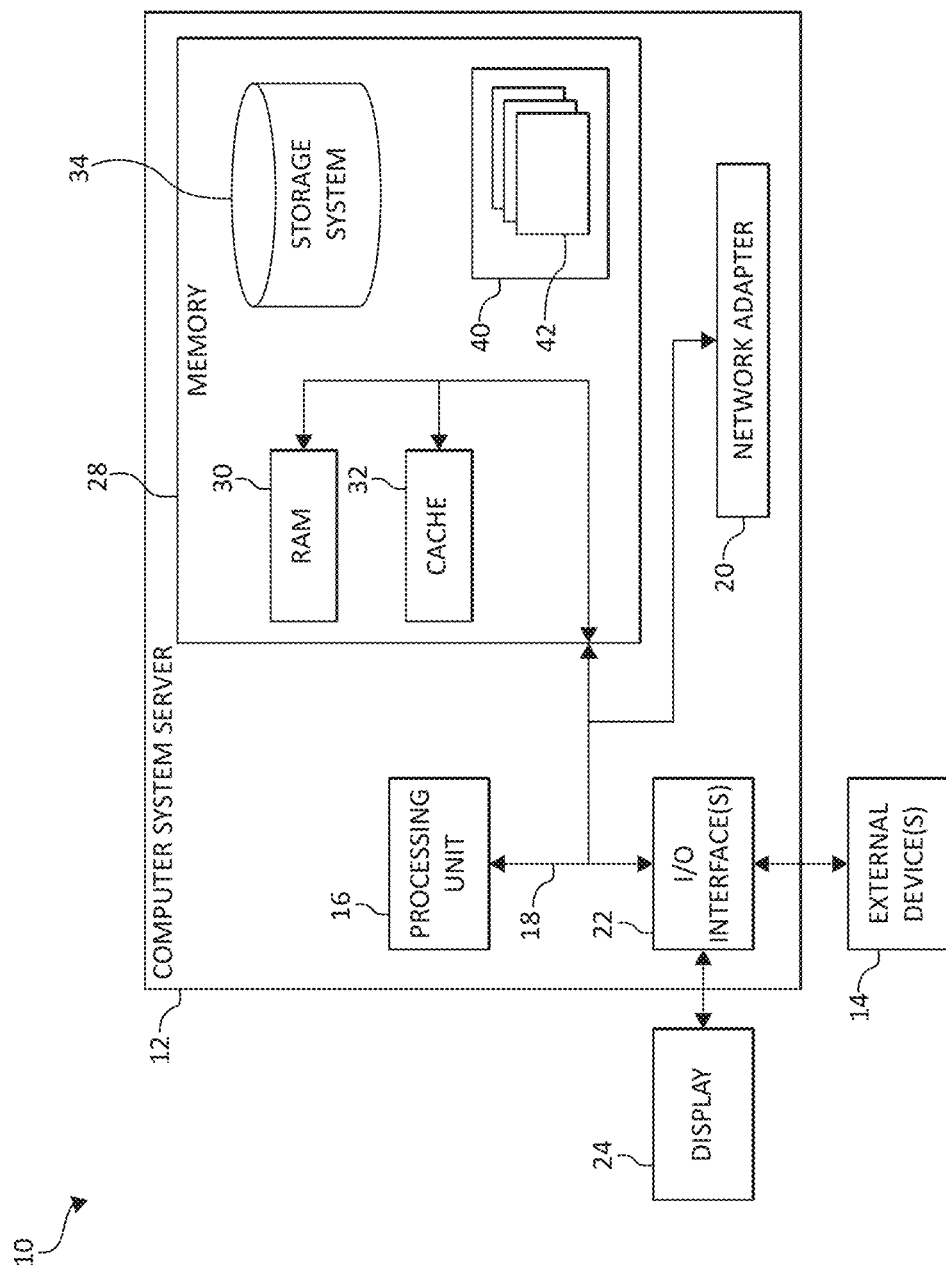
FIG. 1 is a block diagram depicting an exemplary computing node according to an embodiment of the present invention.

As discussed above, in recent years, multiple methods and systems of communication have been developed and are not frequently used, such as voice communication (e.g., telephonic) systems, video communication (e.g., video call) systems, and text-based communication (e.g., text messaging, emails, etc.) systems. In some instances, after the session (e.g., a phone call) has ended, at least one of the parties (e.g., entities, individuals, groups of individuals, etc.) involved in the session realizes that there are topics that they meant to (or wanted to or should) have discussed in the session but did not.

As one example, consider a scenario in which two users (e.g., friends) are communicating via a phone call. During the call, the possibility of them seeing a movie later that day is brought up. The users discuss matters such as which movie they should see, what time they should meet, and whose car they will drive to the theater. However, after the call ends, one of the users realizes that they should have asked about whether or not any other people (e.g., family members) would be going to the movie with them and/or the possibility of eating dinner after the movie. As a result, that user may call the other user back to discuss or clarify those issues. In such a scenario, the "open discussion topic" (i.e., the topic that has not been resolved or completed) was identified or created dynamically during the initial communication session (e.g., the first phone call) based on the discussion content.

As another example, consider a scenario in which one user calls another (e.g., a family member) for a specific reason, such as discussing summer vacation plans. However, for some reason, the discussion becomes sidetracked, and that user forgets to bring up the topic of summer vacation plans. Again, as a result, the user may call the other user back to discuss that specific topic. In such a scenario, the open discussion topic was predefined but still not covered during the discussion.

In such instances, typically, another communication session, or at least additional communications (e.g., phone call, text messages, etc.) have to be initiated or sent in order for such matters to be discussed or clarified.

Thus, what is needed is a method and system which is able to intelligently notify users of relevant topics that they may want to cover during communication sessions and/or automatically generate communications related to those topics.

To address these needs, some embodiments described herein provide methods and systems that, for example, monitor communication sessions between multiple entities or parties (e.g., two or more users, individuals, groups of individuals, etc.) and determine recommended communications for the communication sessions based on, for example, communications sent between the entities during the communication sessions and/or at least one data source associated with at least one of the entities.

In some embodiments, the methods and systems described herein provide interactive, dynamic voice/text responses that may intervene during a conversational situation based on the monitoring of audio, visual, and/or text-based conversations, contextual situations, and cognitive heuristics of the users in order to provide, for example, real-time suggestions to users to ensure completion of the discussion and/or automatically generate communications to ensure such.

In some embodiments, using machine learning techniques (and/or a cognitive analysis), the system analyzes various sources of data, such as previous communication sessions (e.g., previous conversations), users' behavior (or cognitive profile), etc. The analysis is used to identify what information is "required" (or at least desirable) to make the current conversation (or communication session) "complete" for the user(s) (i.e., to ensure that topics that may be relevant or important for the users are covered during the conversation).

For example, during a phone call or text-based communication session (e.g., text messaging), the system may predict that a user has forgotten to ask about a particular topic. In such an instance, the system may generate and provide a notification to the user(s), reminding the user(s) to bring up the topic(s), or automatically generate a suitable communication within the communication session, which is related to the topic(s). As one example, with respect to the phone call regarding going to the movie discussed above, the system may provide a notification to the user(s), reminding them to ask the other user whether or not anyone else will be attending the movie with them, or automatically generate a suitable communication (i.e., in a form suitable for the type of communication session) regarding that topic (e.g., "Is anyone else going to the movie with us?").

In some embodiments, the system tracks users' activity and communications (e.g., voice/speech, text messages, emails, etc.) and determines (or identifies) topics that the users may desire to bring up in communication sessions with other users. In such embodiments, the system may in effect create a rule and execute the communication session intervention described herein when the criteria for the rule are met.

For example, when a first user is in a communication session with a second user, the system may determine that it may be desirable for the first user to bring up a particular topic with a third user. As such, when the first user is later in a communication session with the third user (or even when near the third user in person, face-to-face, etc.), the first user may be provided with a reminder to bring up the topic with the third user (and/or an appropriate communication may be automatically generated). In such an embodiment, the first user may be provided with a query to clarify whether or not the topic should be raised with the third user (i.e., to clarify the rule).

In some embodiments, when the system automatically generates communications, such communications may be generated even if one of the parties is not activity participating in the communication session (e.g., to obtain as much information as possible for the non-participating user). For example, if a first user places a phone call to a second user, and the second user does not answer the call, the system may participate via an answering (or voicemail) system functionality. As a specific example, if the second user does not answer the call, the first user may suggest (e.g., via voice/speech) to the system that the first and second user see a movie later that day. The system may respond in such a way to indicate that the second user is not available to take the call, but may generate inquiries appropriate for the topic at hand (e.g., "What movie would you like to see, and what time would you like to meet?"). The first user's reply (e.g., "Movie XYZ, and let's meet at 5 o'clock") may be stored by the system and later retrieved by the second user. Additionally, the system may generate additional communications that may be related to the topic at hand (e.g., "Are any other people going to the movie?").

In some embodiments, multiple users (and/or the computing devices thereof) may be able to simultaneously utilize the methods and systems described herein. That is, the respective communications of more than one user may be assisted with the methods and systems described herein to ensure any relevant topics for all users are brought up during the communication session.

In some embodiments, a cognitive analysis may be used to performing the communication session management described herein. In some embodiments, the cognitive analysis includes generating a cognitive profile for the user(s) based on, for example, data sources associated with the user(s). Data sources that be use used to generate a cognitive profile for the user(s) may include any appropriate data sources associated with the user that are accessible by the system (perhaps with the permission or authorization of the user). Examples of such data sources include, but are not limited to, previous communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

The cognitive analysis may include classifying natural language, analyzing tone, and analyzing sentiment (e.g., scanning for keywords, key phrases, etc.) with respect to, for example, communications sent during communication sessions and data sources associated with the user(s). In some embodiments, natural language processing (NLP), Mel-frequency cepstral coefficients (MFCCs), and/or region-based convolutional neural network (R-CNN) pixel mapping (e.g., for images sent in communication sessions, objects/people shown in video communication sessions, etc.), as are commonly understood, are used. Over time, the methods and systems described herein may determine correlations (or insights) that allow for an improvement in the determining of the important and/or relevancy of topics to users, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of communication sessions as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such an email application, social media application, a web browser, etc. In other words, as used herein, examples of computing nodes include, for example, computing devices such as mobile phones, tablet devices, desktop computers, or workstations that are owned and/or otherwise associated with individuals (or users), and/or various applications that are utilized by the individuals on such computing devices.

In particular, in some embodiments, a method for managing a communication session by one or more processors is provided. A communication session including a plurality of communications sent between a plurality of entities is monitored. A recommended communication for the communication session is determined based on the plurality of communications and at least one data source associated with at least one of the plurality of entities. A signal representative of the recommended communication is generated.

An indication of the recommended communication may be caused to be rendered to at least one of the plurality of entities and/or the recommended communication may be caused to be rendered within the communication session. The recommended communication may be interrogative. The communication session may include at least one of a voice communication session and a text-based communication session.

The determining of the recommended communication may be performed utilizing a cognitive analysis. The determining of the recommended communication may be performed utilizing at least one of natural language processing (NLP) and Mel-frequency cepstral coefficients (MFCCs).

The at least one data source associated with at least one of the plurality of entities may include at least one of previous communication sessions of the at least one of the plurality of entities, social media activity associated with the at least one of the plurality of entities, and a schedule associated with the at least one of the plurality of entities.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
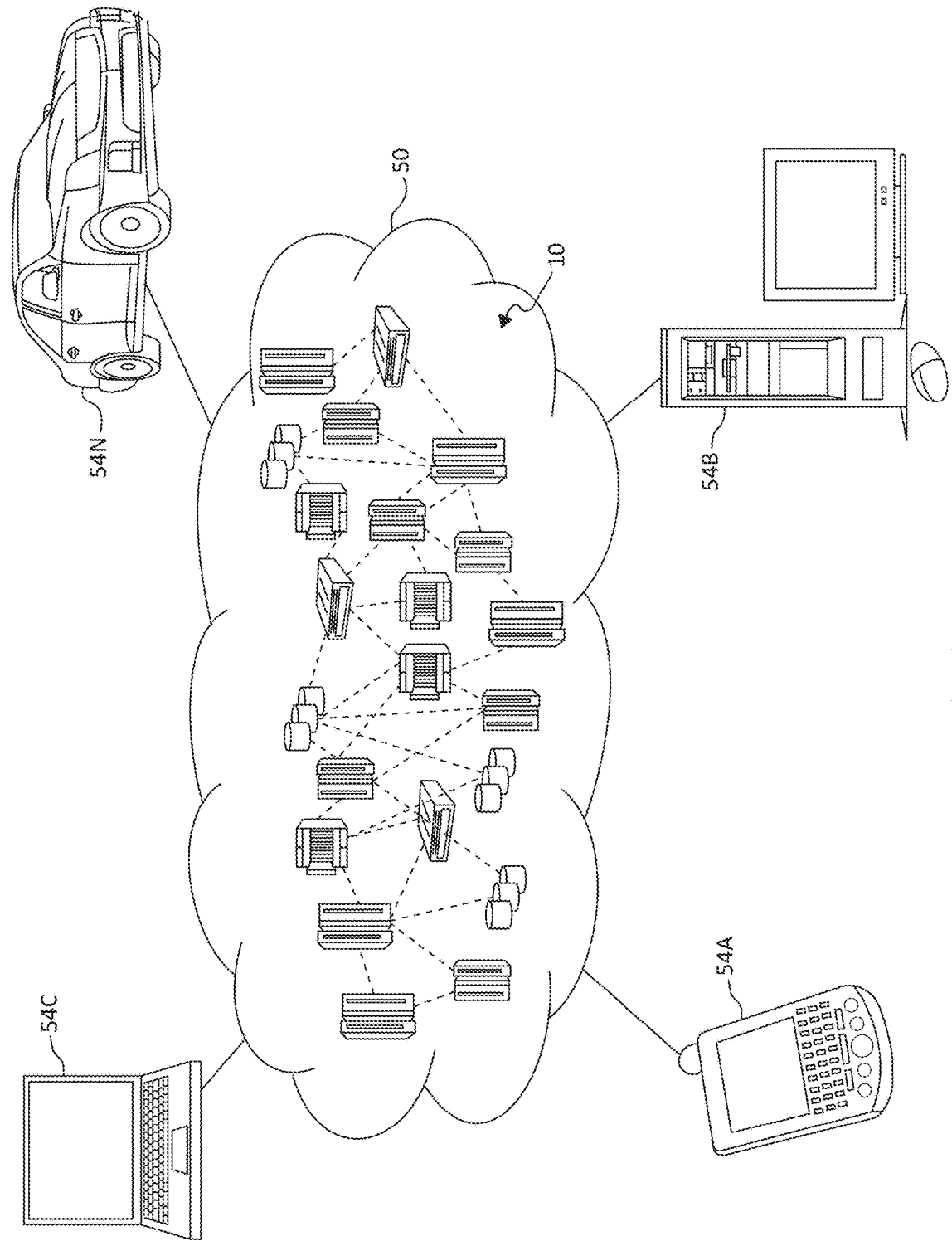
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
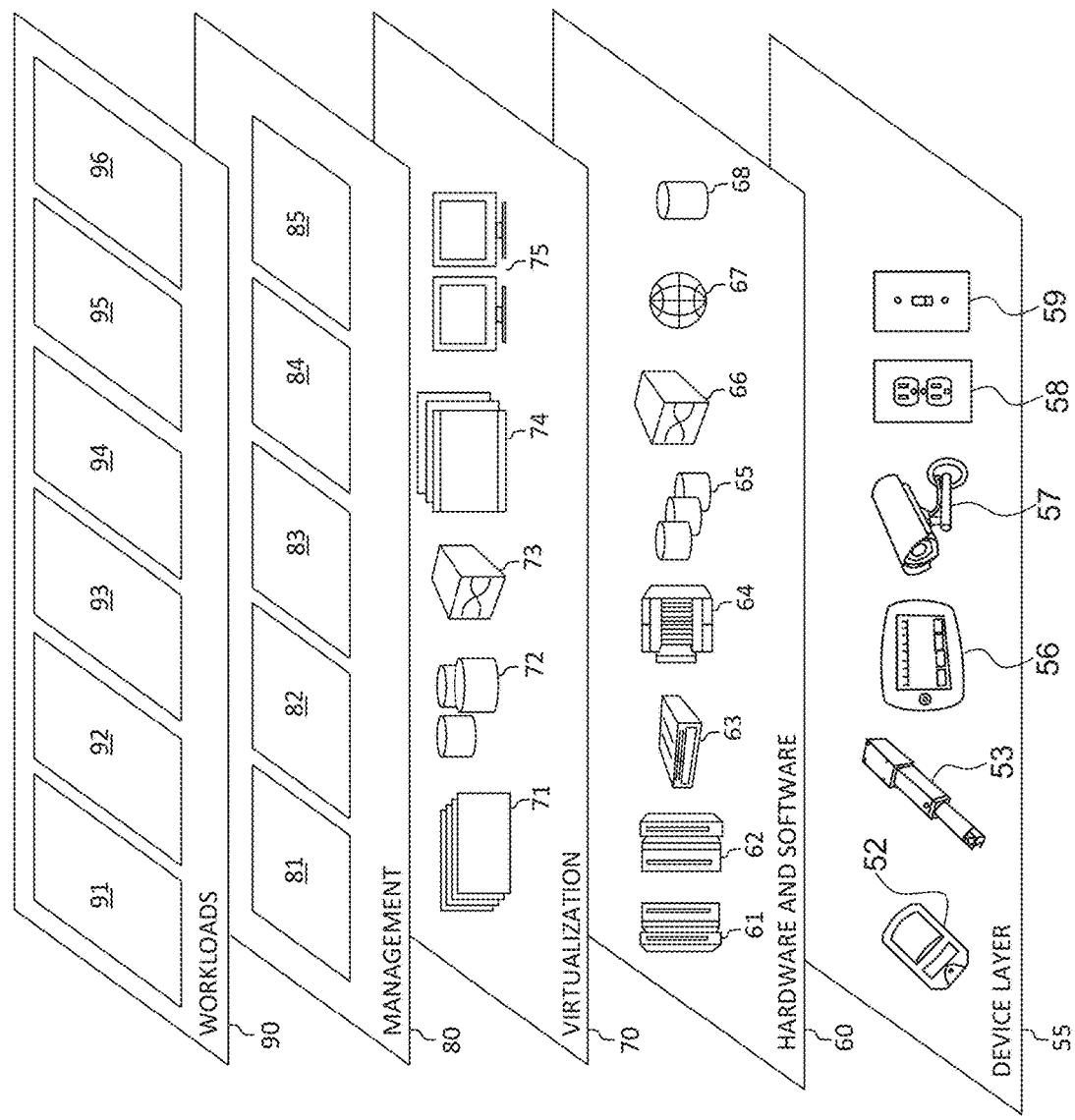
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing communication sessions as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided that, for example, monitor communication sessions between multiple entities or parties (e.g., two or more users, individuals, groups of individuals, etc.) and determine recommended communications for the communication sessions based on, for example, communications sent between the entities during the communication sessions and/or at least one data source associated with at least one of the entities. In some embodiments, the methods and systems described herein provide interactive, dynamic voice/text responses that may intervene during a conversational situation based on the monitoring of audio, visual, and/or text-based conversations, contextual situations, and cognitive heuristics of the users in order to provide, for example, real-time suggestions to users to ensure completion of the discussion and/or automatically generate communications to ensure such.

In some embodiments, a user's (or users') computing device and/or a centralized server (or cognitive module) gathers information related to previous communication sessions. In the case of voice communications, (e.g., phone calls, video calls, etc.) MFCC feature extraction may be used, and in the case of text-based communications or electronic communications (e.g., text messaging, emails, messages sent through messaging applications, etc.), NLP may be used.

In some embodiments, previous (and/or current) communication sessions are analyzed to determine all possible topics, such as questions asked and/or answered/responded to by any user. Previous communication session data may be analyzed using a contextual analysis. The system may extract all possible topics or questions and associated information and answers from the previous sessions and cluster or group them based on, for example, topic.

The system may identify different types of questions and/or information provided for any topic. For example, regarding watching a movie, a user may want to know the location, time, mode of travel (i.e., for getting to the theater), pricing, and/or people attending. As another example, regarding a project report submission, a user may want to know the submission (or due) date, the target audience, who will be reviewing the submission, and/or what topics should be covered. The system may identify what types of questions are asked with respect to particular topics using, for example, a machine learning technique.

Contextual and interest-based information gathered from various data sources may be stored on a database (e.g., in the cloud) for the user. A data processing engine may use unstructured data fetched from different sources and perform unsupervised learning (e.g., using k-means clustering) to categorize the data, thereby aligning repetitive data and habits for accuracy and conformity. As such, related associated activities and contents followed by the user may be categorized within one objective output set with the respective information/keywords/highlights of the activity. For instance, the gathered data may be analyzed and accordingly, keywords may be identified and categorized by, for example, name of person, name of food, name of an activity, name of a place, etc., and may be stored in a knowledge-base (e.g., for the user). Multiple sets of such relationships may be created and stored in user's device (or in a remote database).

In some embodiments, unstructured data may be assigned reconfigurable weights based on activities performed by the user and the repetitiveness of the topics in similar domains to prioritize the content and assign further weight to those activities and related content. Social aspects (e.g., collected from social media platforms, online news sources, or newsfeeds) binding the content may be annexed or combined in a conglomerate form with the activity. Other relevant data associated with the content may be fetched from the online ranking sources to classify the data in a structured format. In some embodiments, structured data may be classified using supervised machine learning algorithms, such as multi-level neural network classification or logistic regression with regularization.

In some embodiments, the system utilizes a dynamic parameter configuration and mood detection based on MFCC feature extraction and NLP to as inputs into a deep learning or neural network model. The system may provide an active feedback to the user based on dynamic preferences determined by the system.

In some embodiments, the system may analyze the behavior (e.g., communications sent by) the participating users, such as questions asked and/or repeated, multiple sessions initiated (e.g., multiple phones calls), questions asked to multiple users, messages sent, etc. Such information may be utilized to identify topics that are relevant or important to the user(s).

In some embodiments, when a communication session (e.g., a phone call, text message, etc.) is initiated, the system may track the topics mentioned in the conversation. When topics are detected, the system may check the available information for related topics and/or information that may need to be clarified. If a possible "information gap" is identified (e.g., a topic that is desirably covered during the communication session but has not yet been covered), the system may determine whether or not an appropriate answer was provided in a previous communication (or communication session). In some embodiments, before intervening in the communication session, the system may wait for a predetermined about of time (e.g., 30 seconds) and/or monitor for an indication that the communication session is about to end (e.g., a user sending a text message such as "OK—I think that's all the information I need for now.").

If the system determines that a possible information gap exists in the communication session and one of the users may be about to end the communication session, the system may generate an appropriate signal, which results in a notification being generated. In some embodiments, at least one of the users is provided with a notification (or reminder) about the topic in a form suitable for the communication session. For example, if the communication session is being performed via text messaging, a user may receive a text message (or another form of electronic message, such as via a pop-up window) reminding them to ask about the particular topic(s). Likewise, if the communication session is a phone call, the user may be provided with an aural prompt, which may or may not be audible to the other user(s) on the phone call, such as "Remember to ask about XYZ."

In some embodiments, the notification is sent in the form of an automated communication (e.g., sent to the appropriate user(s)) related to the topic(s). For example, if the communication session is being performed via text messaging, a text message may be automatically sent (which may or may not be visible to all of the users taking part in the text messaging session) that is related to the topic(s). That is, in some embodiments, communications related to the topics are automatically generated and sent to the appropriate users. For example, if the conversation is related to the users involved in the communication session seeing a movie later that day, and the system detects that the start time for the movie has not been clarified, the system may generate a communication such as "What time does the movie start?" (e.g., in voice/speech form, text-based, etc., depending on the type of communication session) and cause the appropriate computing node(s) to render the communication in an appropriate form. As such, in some embodiments, the system may analyze the conversation and/or the topic(s) thereof and intervene by (automatically) causing appropriate communications to be sent to the appropriate users (or parties, entities, etc.) to assist the user in gathering relevant information. Thus, in some embodiments, the system may essentially participate in the communication session and/or the associated conversation.

In some embodiments, the user is provided with the ability to set reminders for particular situations. For example, if the user would like to discuss a particular topic during a communication session that is going to take place later that day, the user may indicate such (e.g., via text based commands, voice commands, etc.) to their device (e.g., a mobile phone) and/or a centralized server. As such, in some embodiments, the system provides the notifications and/or messages in a manner based on user input (perhaps in combination with the automated functionality described herein).

In some embodiments, the system identifies and tracks the conditions the specific conditions in which specific topics are discussed, which may be utilized in determining whether or not a notification and/or automated communication should be generated. For example, the communication session intervention described herein may be performed only under certain circumstances, such as when a particular user initiates the communication session, certain users are involved in the communication session, and/or when particular topics are brought up by users (e.g., perhaps particular users) during the communication session.

In some embodiments, the system may schedule events for users. For example, if the system determines that a particular topic needs to be discussed by a user, the system may generate and schedule an event for the user (e.g., by creating an entry on the user's schedule or calendar). As a particular example, if the system determines that a first user needs to discuss a particular topic with a second user by a particular date, the system may schedule a communication session (e.g., on one or more of the users' schedules), during which a notification and/or automated communication may be generated. In some embodiments, if the event includes an in-person (or face-to-face) meeting, which may be validated by the proximity of the devices of the respective users, an analysis of detected words/speech, etc., at least one of the users may be provided with a notification (or reminder) to discuss the relevant topic(s) (e.g., via a text message, automated phone call, etc.).

In some embodiments, when the system automatically generates communications, such communications may be generated even if one of the parties is not activity participating in the communication session (e.g., to obtain as much information as possible for the non-participating user). For example, if a first user places a phone call to a second user, and the second user does not answer the call, the system may participate via an answering (or voicemail) system functionality. As a specific example, if the second user does not answer the call, the first user may suggest (e.g., via voice/speech) to the system that the first and second user see a movie later that day. The system may respond in such a way to indicate that the second user is not available to take the call, but may generate inquiries appropriate for the topic at hand.

In some embodiments, communication sessions (e.g., previous communication sessions) from multiple users are tracked and used to improve the performance of the system. For example, if the system determines that a certain portion of users (which may be dynamically controlled based on sample sizing, scope, total population, etc.), when discussing going to see a movie, typically converse about particular matters or topics (e.g., where/which theater, which movie, what time, who is going, why that movie, mode of transportation), the system may utilize such information in determining which topics should be covered in future communication sessions for other users.

As such, in some embodiments, "crowdsourcing" may be utilized to, for example, determine what questions, items, etc. are typically covered when particular topics or subjects are discussed. For example, a particular user may typically go to the same theater, at night, usually on the weekend, with their entire family (e.g., two adults and four children), to see particular types of movies (i.e., those suitable for children). Such information may be utilized by the system with respect to other users (e.g., inquiring about the type of movie, what time it starts, etc.).

Figure 4:
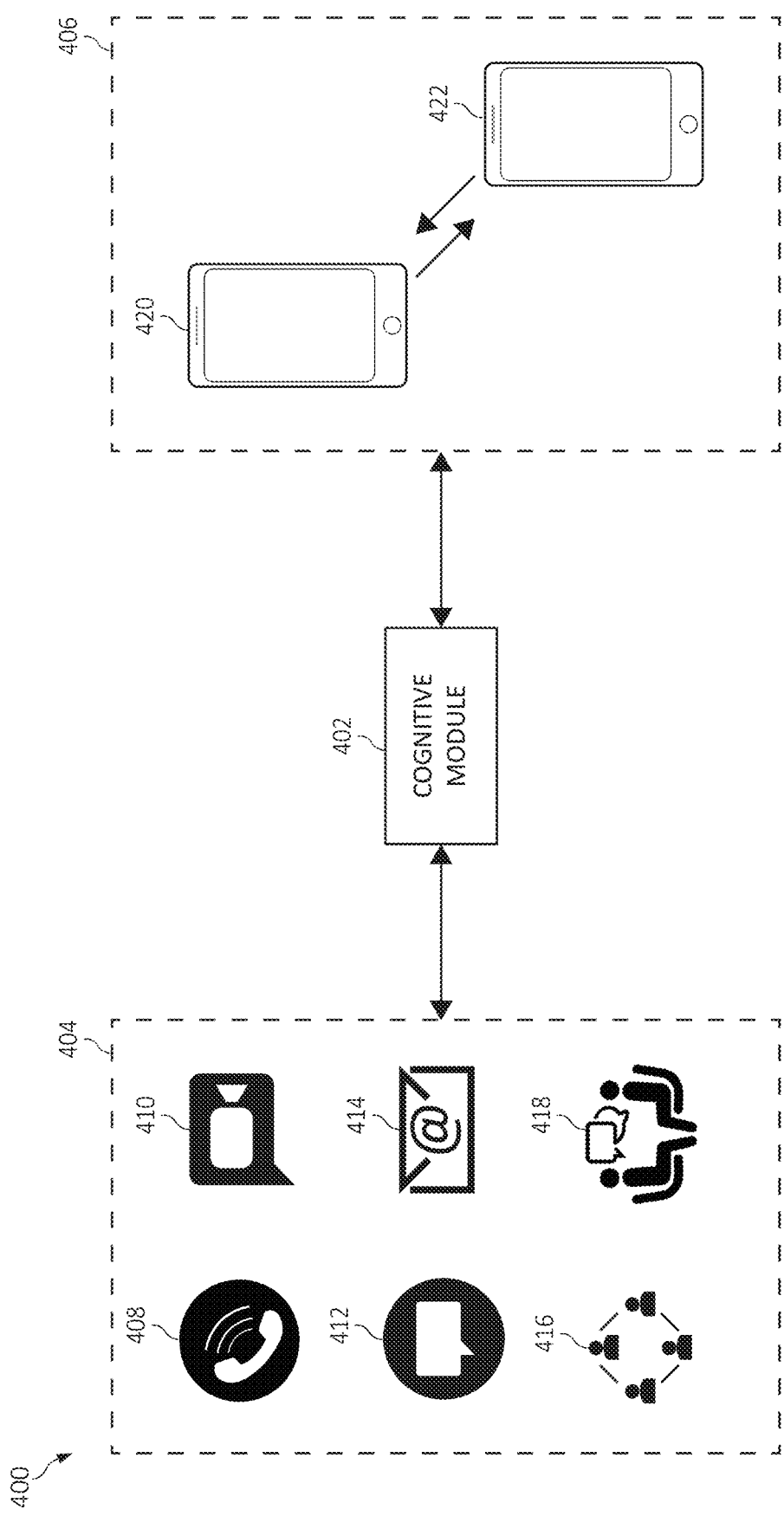
FIG. 4 is a plan view of a computing environment according to an embodiment of the present invention.

FIG. 4 illustrates an exemplary computing environment (or system) 400 according to an embodiment of the present invention. The system 400 includes a cognitive module 402, data sources 404, and a communication session 406. The cognitive module (or more generally, a control system or computing device) 402 may include any suitable computing device or node, such as those described above. The cognitive module 402 may be implemented in any computing device or node, such as those utilized by a user, such as a mobile electronic device, desktop PC, tablet, etc., or as a centralized server/system (e.g., remote from the users, on the cloud, etc.). The cognitive module 402 monitors (and/or has access to and/or is operable communication with) the data sources 404 and the communication session 406 to, for example, perform the functionality described herein.

The data sources 404 may include any suitable data sources associated with one or more users (e.g., those data sources made accessible by and/or granted permission by the user(s)). In the depicted embodiment, the data sources 404 include phone calls (e.g., previous phone calls) 408, video calls 410, text messages (and/or messages sent through a messaging application) 412, emails 414, social media activity (and/or a social media profile) 416, and face-to-face (and/or in person) conversations 418. Generally, the data sources 404, or information associated therewith, may be stored on any suitable memory or database that is accessible by the cognitive module 402. In other embodiments, other data sources may (also) be included or utilized, such as a profile of (or basic information about) the user(s) (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), browsing history (e.g., web pages visited), and online purchases.

In the depicted embodiment, the communication session 406 includes communications sent between two mobile electronic devices 420 and 422, such as mobile phones, each of which may be associated with (or registered to, utilized by, etc.) a respective user (e.g., an individual, group of individuals, an entity, etc.). The communications may include, for example, voice/speech communications sent during a phone call (or conference call) or text-based communications (e.g., text messages, emails, etc.). In other embodiments, the communication session 406 may utilize other types of computing nodes, such as tablet devices, desktop PCs, video cameras (and/or microphones) with different types of communications sent therebetween, such as video streams (and associated audio). Further, in some embodiments, the communication session 406 may include an in-person (or face-to-face) conversation or meeting between the users (e.g., monitored by any suitable device(s), such as a mobile phone, tablet, etc., and/or sensors thereon, such as microphones and/or cameras).

As described above, in some embodiments, the cognitive module monitors the communication session 406 and determines recommended communications for the communication session 406 based on, for example, the communications sent between the users, or more particularly, the devices 420 and 4222 during the communication session 406 and/or at least one of the data sources 404. As such, in some embodiments, the methods and systems provide interactive, dynamic voice/text responses that may intervene during a conversational situation based on the monitoring of audio, visual, and/or text-based conversations, contextual situations, and cognitive heuristics of the users in order to provide, for example, real-time suggestions to users to ensure completion of the discussion and/or automatically generate communications to ensure such.

For example, if the communication session 406 is a phone call, the cognitive module 402 may predict that a user (i.e., associated with either device 420 or 422) has forgotten to ask about a particular topic. In such an instance, the cognitive module 402 may generate and provide a notification to the user(s) (e.g., via a text message or voice prompt rendered by their respective device), reminding the user(s) to bring up the topic(s), or automatically generate a suitable communication within the phone call (e.g., a voice prompt/message rendered by one or both of devices 420 and 422), which is related to the topic(s).

Figure 5:
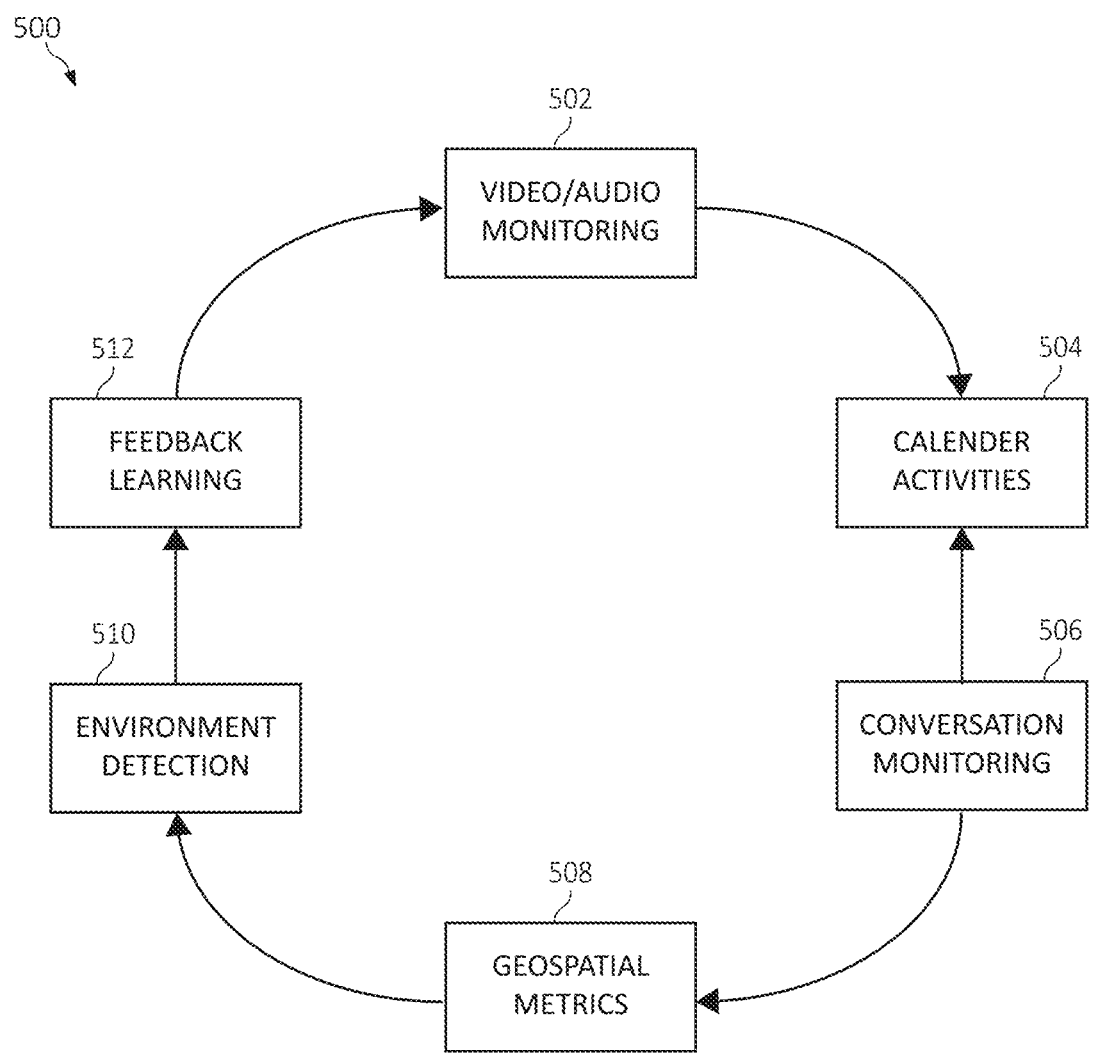
FIG. 5 is a flow chart/block diagram of exemplary initial configuration parameters according to an embodiment of the present invention.

FIG. 5 is a flow chart/block diagram of exemplary initial configuration parameters 500 that may be utilized by the methods and systems described herein. The parameters 500 include video/audio monitoring 502, calendar activities 504, conversation monitoring 506, geospatial metrics 508, environment detection 510, and feedback learning 512. The video/audio monitoring 502 may refer to video and/or audio data that is detected or received by any utilized computing node, such as via cameras and microphones on mobile devices (e.g., the detection of voice/speech content during phone calls or during face-to-face conversations). The calendar activities 504 may refer to scheduled events, items, etc. in or on a schedule/calendar associated with a user. The conversation monitoring 506 may refer to detected communications (e.g., via NPL, MFCCs, etc.) sent during communication sessions. The geospatial metrics 508 may refer to the location of users and/or devices associated therewith and/or the location/position of such devices relative to other devices (e.g., associated with other users). The environment detection 510 may refer to the detection of any data associated with the user's (or users') environment, such as the weather conditions, season, time of day, etc. The feedback learning 512 may refer to the use of feedback provided by the user(s) with respect to, for example, the accuracy of previous notifications and/or automated communications, as described above.

Figure 6:
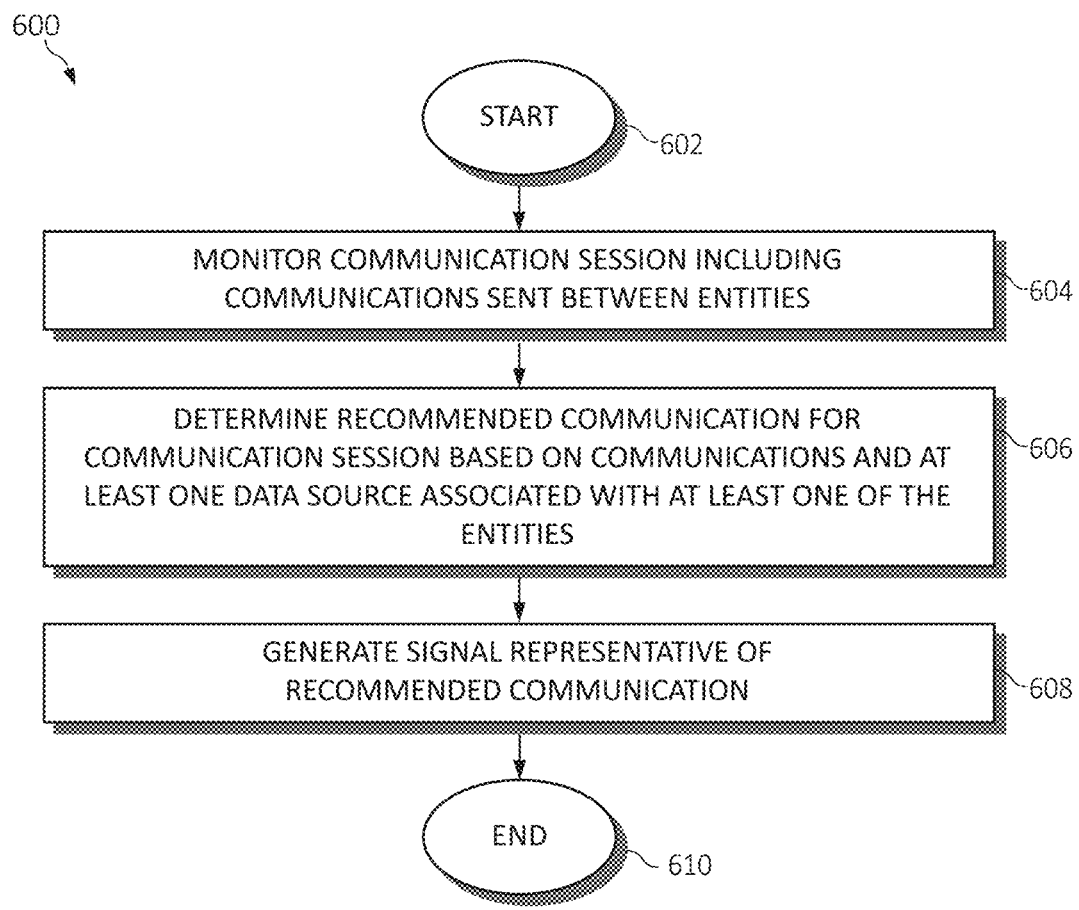
FIG. 6 is a flowchart diagram of an exemplary method for managing communication sessions according to an embodiment of the present invention.

Turning to FIG. 6, a flowchart diagram of an exemplary method 600 for managing communication sessions, in accordance with various aspects of the present invention, is provided. Method 600 begins (step 602) with, for example, a computing system, such as a cognitive module, being provided with access to at least one data source associated with a user (or users) and/or a communication session being initiated.

The communication session is monitored (step 604). The communication session includes a plurality (or at least one) communication sent between a plurality (two or more) entities (e.g., users, individuals, groups of individuals, etc.). The communication session may be, for example, an audio (or voice) and/or video communication session, such as a phone call or video call, or a text-based communication session, such as an email exchange (or chain), text messaging session, or messaging session performed via a messaging application. As such, the communication(s) sent between the entities may include voice/speech communications, video communications, or text-based communications. In some embodiments, the communication session may include a face-to-face conversation or meeting (e.g., monitored by one or more computing device, such as a mobile phone or tablet).

A recommended communication for the communication session is determined based on the plurality of communications and at least one data source associated with at least one of the plurality of entities (step 606). The determining of the recommended communication may be performed utilizing a cognitive analysis. The determining of the recommended communication may be performed utilizing at least one of natural language processing (NLP) and Mel-frequency cepstral coefficients (MFCCs). The at least one data source associated with at least one of the plurality of entities may include at least one of previous communication sessions of the at least one of the plurality of entities, social media activity associated with the at least one of the plurality of entities, and a schedule associated with the at least one of the plurality of entities. As described above, the recommended communication may be a communication (e.g., a question or interrogative statement) that is determined to be required, or at least desired, to make the communication session (or conversation) "complete" for at least one of the entities. That is, the recommended communication may be determined to be related to a topic that is, for at least one of the entities, ideally or desirably discussed or covered during the communication session.

A signal representative of the recommended communication is generated (step 608). As described above, the generated signal may be used to cause an indication of the recommended communication to be rendered to at least one of the plurality of entities and/or to cause the recommended communication to be rendered within the communication session. For example, a notification or alert (e.g., in the form of a text message, pop-up window, voice prompt, etc.) may be rendered by a computing device being utilized by at least one of the entities, which serves as a reminder or notification to discuss a particular topic. Alternatively, a suitable communication (e.g., text message, voice prompt, etc.), which is similar or identical to the recommended communication, may be automatically rendered within the communication session and rendered by at least one of the computing devices or nodes being utilized in the communication session.

Method 600 ends (step 610) with, for example, the communication session being terminated by at least one of the entities. The process may be repeated upon the initiation of another communication session. In some embodiments, the entities (or users) may provided feedback related to the accuracy or usefulness of the recommended communications and/or notifications, which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a communication session comprising:

monitoring, by the one or more processors on a mobile computing device, a communication session occurring on the mobile device including a plurality of communications sent between a plurality of entities;

determining, by the one or more processors, a recommended communication for the communication session based on the plurality of communications and at least one data source associated with at least one of the plurality of entities according to a cognitive analysis of the plurality of communications and the at least one data source performed using a machine learning operation, wherein the recommended communication is indicative of a topic or utterance predicted as necessarily discussed, to resolve a matter of the communication session, by at least one of the plurality of entities which was not discussed in the communication session prior to the determining, and wherein the determining includes, subsequent to identifying the topic or utterance predicted as necessarily discussed, identifying that the topic or utterance was not previously discussed in a historical communication session; and responsive to determining the recommended communication according to the cognitive analysis and identifying cues that the communication session is ending, generating, by the one or more processors, a signal representative of the recommended communication by causing an indication of the recommended communication to be rendered on the mobile computing device to at least one of the plurality of entities.

2. The method of claim 1, further comprising causing the recommended communication to be rendered within the communication session.

3. The method of claim 1, wherein the recommended communication is interrogative.

4. The method of claim 1, wherein the communication session includes at least one of a voice communication session and a text-based communication session.

5. The method of claim 1, wherein the determining of the recommended communication is performed utilizing at least one of natural language processing (NLP) and Mel-frequency cepstral coefficients (MFCCs).

6. The method of claim 1, wherein the at least one data source associated with at least one of the plurality of entities includes at least one of previous communication sessions of the at least one of the plurality of entities, social media activity associated with the at least one of the plurality of entities, and a schedule associated with the at least one of the plurality of entities.

7. A system for managing a communication session comprising:
a mobile computing device having at least one processor that
monitors, by the at least one processor on the mobile computing device, a communication session occurring on the mobile device including a plurality of communications sent between a plurality of entities;
determines, by the at least one processor, a recommended communication for the communication session based on the plurality of communications and at least one data source associated with at least one of the plurality of entities according to a cognitive analysis of the plurality of communications and the at least one data source performed using a machine learning operation, wherein the recommended communication is indicative of a topic or utterance predicted as necessarily discussed, to resolve a matter of the communication session, by at least one of the plurality of entities which was not discussed in the communication session prior to the determining, and wherein the determining includes, subsequent to identifying the topic or utterance predicted as necessarily discussed, identifying that the topic or utterance was not previously discussed in a historical communication session; and
responsive to determining the recommended communication according to the cognitive analysis and identifying cues that the communication session is ending, generates, by the at least one processor, a signal representative of the recommended communication by causing an indication of the recommended communication to be rendered on the mobile computing device to at least one of the plurality of entities.

8. The system of claim 7, wherein the at least one processor further causes the recommended communication to be rendered within the communication session.

9. The system of claim 7, wherein the recommended communication is interrogative.

10. The system of claim 7, wherein the communication session includes at least one of a voice communication session and a text-based communication session.

11. The system of claim 7, wherein the determining of the recommended communication is performed utilizing at least one of natural language processing (NLP) and Mel-frequency cepstral coefficients (MFCCs).

12. The system of claim 7, wherein the at least one data source associated with at least one of the plurality of entities includes at least one of previous communication sessions of the at least one of the plurality of entities, social media activity associated with the at least one of the plurality of entities, and a schedule associated with the at least one of the plurality of entities.

13. A computer program product for managing a communication session by one or more processors, the computer program product comprising a non-transitory computer-readable storage medium having computer-readable program code portions stored therein, the computer-readable program code portions comprising:
an executable portion that monitors, by the one or more processors on a mobile computing device, a communication session occurring on the mobile device including a plurality of communications sent between a plurality of entities;
an executable portion that determines, by the one or more processors, a recommended communication for the communication session based on the plurality of communications and at least one data source associated with at least one of the plurality of entities according to a cognitive analysis of the plurality of communications and the at least one data source performed using a machine learning operation, wherein the recommended communication is indicative of a topic or utterance predicted as necessarily discussed, to resolve a matter of the communication session, by at least one of the plurality of entities which was not discussed in the communication session prior to the determining, and wherein the determining includes, subsequent to identifying the topic or utterance predicted as necessarily discussed, identifying that the topic or utterance was not previously discussed in a historical communication session; and
an executable portion that, responsive to determining the recommended communication according to the cognitive analysis and identifying cues that the communication session is ending, generates, by the one or more processors, a signal representative of the recommended communication by causing an indication of the recommended communication to be rendered on the mobile computing device to at least one of the plurality of entities.

14. The computer program product of claim 13, wherein the computer-readable program code portions further include an executable portion that causes the recommended communication to be rendered within the communication session.

15. The computer program product of claim 13, wherein the recommended communication is interrogative.

16. The computer program product of claim 13, wherein the communication session includes at least one of a voice communication session and a text-based communication session.

17. The computer program product of claim 13, wherein the determining of the recommended communication is performed utilizing at least one of natural language processing (NLP) and Mel-frequency cepstral coefficients (MFCCs).

18. The computer program product of claim 13, wherein the at least one data source associated with at least one of the plurality of entities includes at least one of previous communication sessions of the at least one of the plurality of entities, social media activity associated with the at least one of the plurality of entities, and a schedule associated with the at least one of the plurality of entities.

\* \* \* \* \*